(12) United States Patent
Liu et al.

(10) Patent No.: US 11,301,725 B2
(45) Date of Patent: Apr. 12, 2022

(54) VISUAL RELATIONSHIP DETECTION METHOD AND SYSTEM BASED ON REGION-AWARE LEARNING MECHANISMS

(71) Applicant: TIANJIN UNIVERSITY, Tianjin (CN)

(72) Inventors: Anan Liu, Tianjin (CN); Hongshuo Tian, Tianjin (CN); Ning Xu, Tianjin (CN); Weizhi Nie, Tianjin (CN); Dan Song, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 17 days.

(21) Appl. No.: 17/007,245

(22) Filed: Aug. 31, 2020

(65) Prior Publication Data
US 2021/0264216 A1 Aug. 26, 2021

(30) Foreign Application Priority Data
Feb. 3, 2020 (CN) .......................... 202010079031.6

(51) Int. Cl.
*G06K 9/62* (2006.01)
*G06K 9/46* (2006.01)
*G06N 20/00* (2019.01)

(52) U.S. Cl.
CPC .............. *G06K 9/6262* (2013.01); *G06K 9/46* (2013.01); *G06K 9/629* (2013.01); *G06K 2009/4666* (2013.01); *G06N 20/00* (2019.01)

(58) Field of Classification Search
CPC ........ G06K 9/6262; G06K 9/46; G06K 9/629; G06K 2009/4666; G06K 9/6256;
(Continued)

(56) References Cited

U.S. PATENT DOCUMENTS

| 5,581,634 A | * 12/1996 | Heide | .................. G06K 9/4638 382/203 |
| 6,847,980 B1 | * 1/2005 | Benitez | .................. G06F 16/71 707/741 |

(Continued)

OTHER PUBLICATIONS

Xu et al., "Scene Graph Inference via Multi-Scale Context Modeling", IEEE, Mar. 3, 2021 (Year: 2021).*

(Continued)

*Primary Examiner* — Aaron W Carter
(74) *Attorney, Agent, or Firm* — Dragon Sun Law Firm, PC; Jinggao Li, Esq.

(57) ABSTRACT

The present invention discloses a visual relationship detection method based on a region-aware learning mechanism, comprising: acquiring a triplet graph structure and combining features after its aggregation with neighboring nodes, using the features as nodes in a second graph structure, and connecting in accordance with equiprobable edges to form the second graph structure; combining node features of the second graph structure with features of corresponding entity object nodes in the triplet, using the combined features as a visual attention mechanism and merging internal region visual features extracted by two entity objects, and using the merged region visual features as visual features to be used in the next message propagation by corresponding entity object nodes in the triplet; and after a certain number of times of message propagations, combining the output triplet node features and the node features of the second graph structure to infer predicates between object sets.

8 Claims, 3 Drawing Sheets

(58) Field of Classification Search
CPC .............. G06K 9/6277; G06K 9/6296; G06K 2209/21; G06N 20/00; G06N 3/0454; G06N 3/08
See application file for complete search history.

(56) References Cited

U.S. PATENT DOCUMENTS

| | | | |
|---|---|---|---|
| 10,642,891 B2* | 5/2020 | Choe | G06F 16/73 |
| 10,679,133 B1* | 6/2020 | Mathur | G06N 5/046 |
| 2014/0181000 A1* | 6/2014 | Syed | G06N 5/04 |
| | | | 706/56 |
| 2019/0171864 A1* | 6/2019 | Nakayama | G06N 3/0454 |
| 2020/0401835 A1* | 12/2020 | Zhao | G06N 5/022 |
| 2021/0133461 A1* | 5/2021 | Ren | G06T 7/246 |
| 2021/0192274 A1* | 6/2021 | Liu | G06K 9/6222 |
| 2021/0264216 A1* | 8/2021 | Liu | G06K 9/6256 |
| 2021/0374489 A1* | 12/2021 | Prakash | G06K 9/6267 |

OTHER PUBLICATIONS

Liu et al., "Adaptively Clustering-Driven Learning for Visual Relationship Detection", IEEE, Dec. 2019 (Year: 2019).*

Liu et al., "Toward Region-Aware Attention Learning for Scene Graph Generation", IEEE, 2021 (Year: 2021).*

* cited by examiner

VISUAL RELATIONSHIP DETECTION METHOD AND SYSTEM BASED ON REGION-AWARE LEARNING MECHANISMS

CROSS-REFERENCE TO RELATED PATENT APPLICATION

This application claims priority to and the benefit of CN 202010079031.6, filed Feb. 3, 2020, entitled "VISUAL RELATIONSHIP DETECTION METHOD BASED ON REGION-AWARE LEARNING MECHANISMS," by Anan LIU et al. The entire disclosure of the above-identified application is incorporated herein by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the present disclosure described herein. All references cited and discussed in this specification are incorporated herein by reference in their entireties and to the same extent as if each reference was individually incorporated by reference.

TECHNICAL FIELD

The present invention relates to the field of visual relationship detection and in particular to a visual relationship detection method and a system based on a region-aware learning mechanism.

BACKGROUND OF THE PRESENT INVENTION

With the rapid development of deep learning, the field of image understanding has gradually attracted a lot of attention. As the basis of this field, visual relationship detection is a very challenging task, because it not only needs to predict the semantic meaning of entity objects in images and spatial information, but also needs to classify predicate relationships between entity objects. Taking the image of "man riding a motorcycle" in FIG. 1 as an example, the visual relationship detection not only needs to recognize the subject "man" and the object "motorcycle" and the position therebetween, but also needs to recognize that there is a "riding" relationship therebetween. Because general visual relationships can be described by a structured triplet <subject-predicate-object>, visual relationship detection can be used as the basis for image understanding and thus applied to higher-level visual tasks such as image description [2][3], visual question answering[4] [5], image-text matching[6] [7], visual dialogue[8] [9] and visual reasoning[10] [11].

In recent years, great efforts have been paid on the task of visual relationship detection. Roughly speaking, the learning strategies for these efforts can be roughly divided into two ways. In one way, detectors for entity objects and detectors for the relationship between the entity objects are trained separately, and then their model outputs are aggregated to obtain a triplet of visual relationships. In the other way, a separate detector is learned for each visual phrase containing a visual relationship. For diverse visual relationships, some scholars have proven that visual phrase learning methods provide more robustness[12], but for the existing data sets, this method has certain limitations since training samples for specific relationships are quite few. As for the method of aggregating the model outputs, although the knowledge contained in each of the structured triplets can be well shared between the structured triplets[13], it cannot be handled well for invisible relationships.

At present, in order to improve the feature representation capabilities of general-purpose detectors, researchers gradually tend to design models that rely on statistical relationships which can be graph models[14], knowledge distillation of corpus[15], or semantic meaning of context[16].

However, the existing methods simply extract features of the detected entity objects as a whole from a coarse-grained perspective, and then map the extracted features to a same feature space for relationship recognition. Actually, these methods ignore some fine-grained cues inside the entity objects, thus are unable to more deeply explore information about regions of interest inside the detected entity objects in different visual relationships.

Therefore, a heretofore unaddressed need exists in the art to address the aforementioned deficiencies and inadequacies.

SUMMARY OF THE PRESENT INVENTION

The present invention provides a visual relationship detection method based on a region-aware learning mechanism. The present invention avoids the lack of interaction of fine-grained information about internal regions of the entity objects in the established models during the analysis on the relationships between the entity objects in a same feature space. Furthermore, after learning by using a visual attention mechanism, the internal regions focused by the entity objects in different visual relationships can be recognized. Thus, the accuracy of visual relationship detection is improved. The details of the present invention will be described below.

A visual relationship detection method based on a region-aware learning mechanism is provided, comprising:

acquiring a triplet graph structure and combining features after its aggregation with neighboring nodes, using the features as nodes in a second graph structure, and connecting in accordance with equiprobable edges to form the second graph structure;

combining node features of the second graph structure with features of corresponding entity object nodes in the triplet, using the combined features as a visual attention mechanism and merging internal region visual features extracted by two entity objects, and using the merged region visual features as visual features to be used in the next message propagation by corresponding entity object nodes in the triplet; and after a certain number of times of message propagations, combining the output triplet node features and the node features of the second graph structure to infer predicates between object sets.

Wherein, the step of "acquiring a triplet graph structure" specifically comprises:

using region visual features of the entity objects as features of a set of nodes in the first graph structure, connecting the entity objects in accordance with probabilities of co-occurrence, and gathering feature information of neighboring nodes by a message propagation mechanism to enhance the visual representation of the current node;

using, after each message propagation, the output node features as the visual attention mechanism and also as the visual features to be used in the next message propagation by the nodes in the first graph structure; and using the extracted features of each object set and region visual features of the corresponding two entity objects as a set of nodes, and connecting in accordance with the statistical probabilities of visual relationships to form a triplet graph structure.

Further, the first graph structure is specifically as follows: co-occurrence matrixes are used as edges of the first graph structure and region visual features are used as vertices of the first graph structure.

Wherein, the step of "using, after each message propagation, the output node features as the visual attention mechanism and also as the visual features to be used in the next message propagation by the nodes in the first graph structure" specifically comprises:

combining the enhanced node representation with each region visual feature, to compute an unnormalized relevance score;

normalizing the unnormalized relevance score to acquire a weight distribution value of the visual attention mechanism;

obtaining the weighted sum of M region features of each entity object by the acquired weight distribution value of the attention mechanism, to obtain the merged visual representation; and acquiring the merged visual representation, and performing message propagation by using the merged visual representation as the visual features to be used in the next message propagation by corresponding nodes in the first graph structure.

Further, the triplet graph structure is specifically as follows:

the statistical probabilities of visual relationships are used as edges of the triplet graph structure; and the features of each object set and the region visual features of the corresponding two entity objects are used as vertices of the triplet graph structure.

Wherein, the second graph structure is specifically as follows:

Acquiring output features of each triplet graph structure after its aggregation with neighboring nodes, mapping the acquired features to a feature space in a same dimension, and then connecting them in the dimension of feature as the nodes in the second graph structure; and fully connecting the nodes in the second graph structure, and edges connecting each node and its neighboring nodes are equiprobable edges.

Further, the step of "using the combined features as a visual attention mechanism and merging internal region visual features extracted by two entity objects" specifically comprises:

computing an unnormalized relevance score by the combined features and each output region visual feature; and normalizing the unnormalized relevance score to acquire a weight distribution value of the visual attention mechanism, and obtaining the weighted sum of region features of the corresponding entity object to obtain the merged visual representation.

Wherein, the step of "combining the output triplet node features and the node features of the second graph structure" specifically comprises:

outputting the nodes of each entity object in the triplet graph structure after $T_k$ message propagations, processing with the average pooling strategy and then combining with the visual features of the entity object itself in the dimension of feature; and outputting the nodes of the object sets in the triplet graph structure after $T_k$ message propagations, and connecting with the object set features of an initialized node and the output of each node in the second graph structure in the dimension of feature.

The technical solutions of the present invention have the following beneficial effects:

1. in the present invention, after the entity objects are detected, a set of features of the internal regions are extracted and mapped to a same feature space to complete the interaction of information about features of the internal regions in the entity objects in different visual relationships; and 2. in the present invention, after learnt by using the attention mechanism, the internal regions focused by the entity objects in different visual relationships can be recognized. Thus, the accuracy of visual relationship detection is improved.

BRIEF DESCRIPTION OF THE DRAWINGS

The accompanying drawings illustrate one or more embodiments of the present invention and, together with the written description, serve to explain the principles of the invention. Wherever possible, the same reference numbers are used throughout the drawings to refer to the same or like elements of an embodiment.

DETAILED DESCRIPTION OF THE PRESENT INVENTION

The present invention will now be described more fully hereinafter with reference to the accompanying drawings, in which exemplary embodiments of the present invention are shown. The present invention may, however, be embodied in many different forms and should not be construed as limited to the embodiments set forth herein. Rather, these embodiments are provided so that this disclosure is thorough and complete, and will fully convey the scope of the invention to those skilled in the art. Like reference numerals refer to like elements throughout.

To make the objectives, technical solutions and advantages of the present invention clearer, the implementations of the present invention will be further described below in detail.

Figure 1:
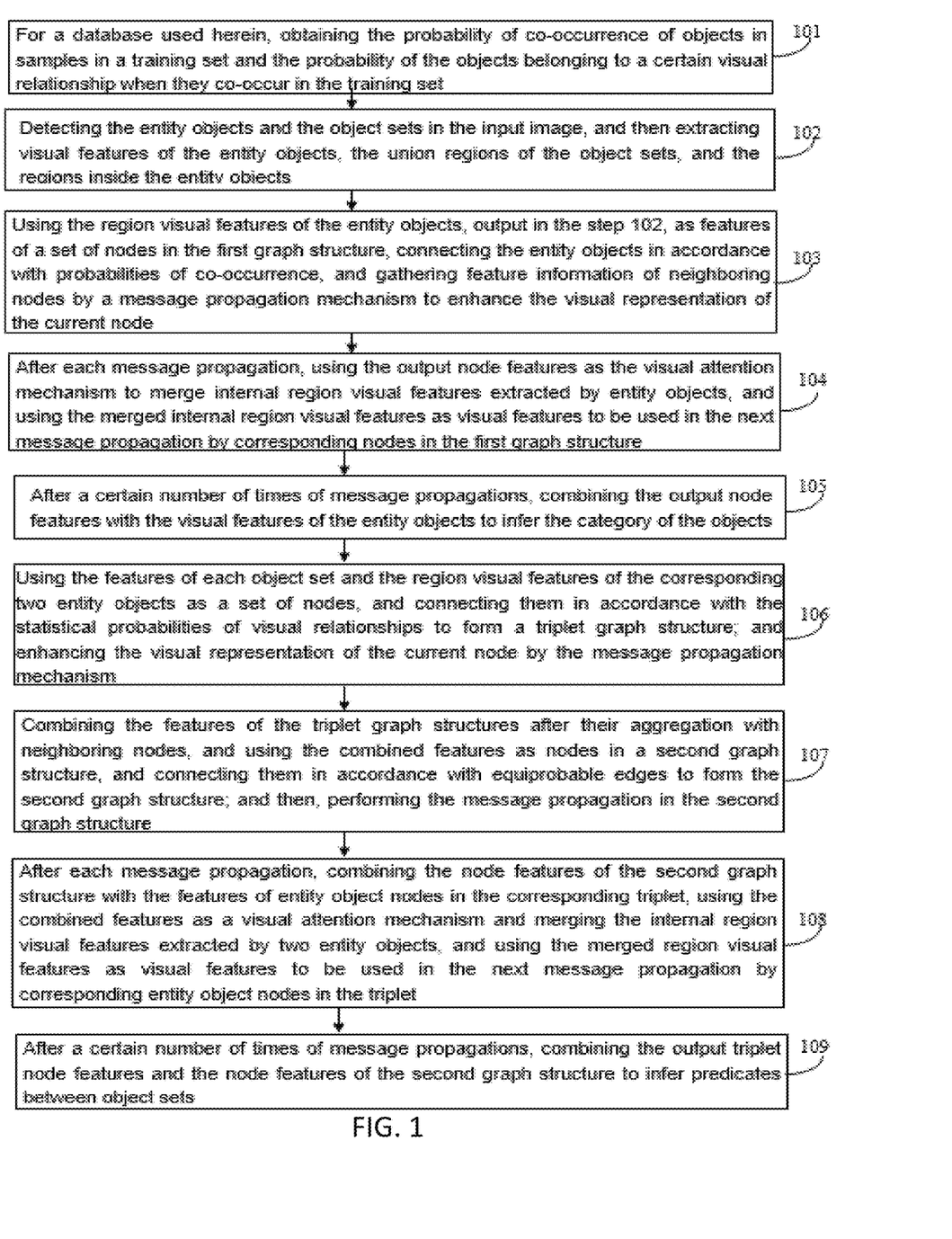
FIG. 1 is a flowchart of a visual relationship detection method based on a region-aware learning mechanism according to the present invention.
Figure 2:
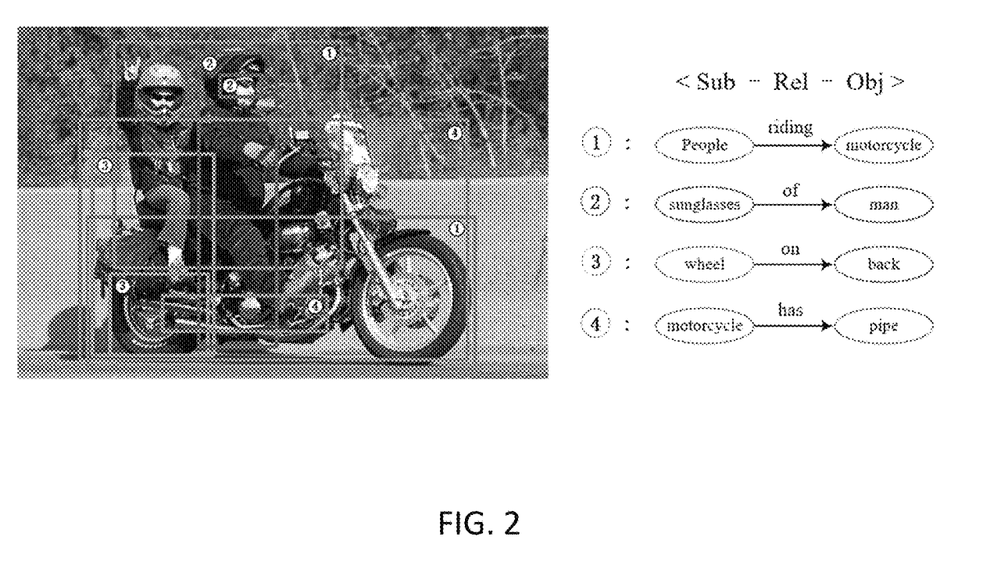
FIG. 2 is a schematic view of visual relationship detection.

To overcome the existing problem of ignoring the interaction of fine-grained information about the regions inside the entity objects during the detection of visual relationships so as to improve the accuracy of visual relationship detection (recall rate, as the commonly used indicator), referring to FIG. 1, an embodiment of the present invention provides a visual relationship detection method based on a region-aware learning mechanism, comprising:

101: for a database used herein, the probability of co-occurrence of objects in samples in a training set and the probability of the objects belonging to a certain visual relationship when they co-occur in the training set are obtained.

A data set used herein contains image data labeled with visual relationships, a commonly used Visual Genome visual relationship database is adopted herein. However, the method of the present invention is not limited to this database. It may be any database containing the desired labels.

Firstly, for the database used herein, it is necessary to obtain the co-occurrence probability distribution between different categories of objects in the training sets divided from the database. The training samples in this visual relationship data set are labeled with the real category labels of the entity objects and the real category labels of the visual relationship predicates between the entity objects. Take the entity objects m and n in an image in the training samples as an example, where, m and n are the real category labels of the two entity objects, the probability of occurrence of the entity objects belonging to the category n under the condition that the entity objects belonging to the category m occur is obtained. In the method of the present invention, after the co-occurrence probability of all the entity objects is obtained, the corresponding co-occurrence probability matrix is written as $\varepsilon \in R^{c \times c}$. The element $\varepsilon_{ij}$ in the matrix denotes the probability of co-occurrence of one entity object belonging to the $i^{th}$ category and another entity object belonging to the $j^{th}$ category; C denotes the total number of categories of entity objects in the training set; and R is a set of real numbers.

Secondly, it is necessary to obtain the probability that the entity objects in the training set belong to a certain visual relationship when they co-occur. Specifically, it is necessary to obtain the relationship distribution probabilities of the entity objects belonging to the category m and the entity objects belonging to category n in all training samples. In the method of the present invention, after obtaining the relationship distribution probabilities of all entity object sets, the corresponding visual relationship distribution is written as $\{\varepsilon'_{ij}{}^{(k)}\}$, where $k \in [1,K]$ and $k \in \mathbb{Z}$. Where, $\varepsilon'_{ij}{}^{(k)}$ denotes the probability that the first $i^{th}$ category of entity objects and the p category of entity objects have the $k^{th}$ visual relationship, K denotes the total number of categories of visual relationships or predicates in the training set, and $\mathbb{Z}$ is a set of natural numbers. 102: The entity objects and the object sets are detected in the input image, and then visual features of the entity objects, the union regions of the object sets, and the regions inside the entity objects are extracted.

For the input image, firstly, features of the entity objects and the object sets are extracted by a common target detection framework, such as GoogLeNet, ResNet-101, VGG-16. The method of the present invention adopts a Faster R-CNN framework using a VGG-16 convolutional network. The convolutional network may be replaced with other common target detection networks. A given image is input to the target detection framework. As outputs, features of candidate regions of the entity objects and features of candidate regions of the object sets in the image can be obtained. The candidate regions refer to minimum rectangular regions that can completely cover the entity objects or object sets.

The output region features include: a set of entity object features, $V=\{v_n\}_{n=1}^{N}$ output by the entity objects in the candidate regions in the fully-connected layer in the VGG16 network, where $v_n$ denotes the visual feature of the $n^{th}$ entity object; a set of coordinate features $B=\{b_n\}_{n=1}^{N}$ of the rectangular box of the candidate regions, where $b_n$ denotes the coordinate features of a minimum rectangular box of the $n^{th}$ entity object; a set of features, $F_u=\{f_{ij}|i,j=1,2,\ldots,|N|\}$, output by the object sets in the fully-connected layer in the VGG16 network, where $f_{ij}$ denotes features in the minimum rectangular box region covering the $i^{th}$ entity object and the $j^{th}$ entity object; a set of real category label probabilities of the entity objects $O=\{o_n\}_{n=1}^{N}$, where N denotes the number of entity objects in the image, $o_n$ denotes the real category label of the $n^{th}$ entity object; region visual features, $f^{(n)}=\{f_m{}^{(n)}\}$, output by the entity objects in the convolutional layer in the VGG16 network, where $m \in [1,M]$ and $m \in Z$, M denotes the number of regions inside the entity objects, and $f_m{}^{(n)}$ denotes the $m^{th}$ region inside the $n^{th}$ entity object.

103: The region visual features of the entity objects, output in the step 102, are used as features of a set of nodes in the first graph structure, the entity objects are connected in accordance with probabilities of co-occurrence, and feature information of neighboring nodes is gathered by a message propagation mechanism to enhance the visual representation of the current node.

The co-occurrence matrixes, output in the step 101, are used as edges of the first graph structure:

$$E_{obj}=\{\varepsilon_{ij}|i=1,2,\ldots,|C|;j=1,2,\ldots,|C|\}$$

where $E_{obj}$ denotes a set of edges of the first graph structure.

The region visual features $f^{(n)}$, output in the step 102, are used as vertices of the first graph structure:

$$V_{obj}=\{f_m{}^{(n)}|m=1,2,\ldots,|M|;n=1,2,\ldots,|N|\}$$

where $V_{obj}$ denotes a set of nodes in the first graph structure.

In this way, the first graph structure $G_{obj}=\{V_{obj},E_{obj}\}$ is formed.

Firstly, before message propagation, in order to learn the initial visual attention weight to merge the region visual features at the vertices, the set of entity object features V output in the step 102 is used to replace, at the time step t=0, the region visual features to initialize the representation $h_n{}^{(t)}$ of the vertices in the first graph structure, where n denotes the $n^{th}$ vertex:

$$h_n{}^{(t)}=\varphi_n(v_n), t=0 \qquad (1)$$

where $\varphi_n$ denotes the learned transformation matrix, and denotes the features of the fully-connected layer output in the step 102.

Secondly, the features $a_n{}^{(t)}$ of each node after its aggregation with neighboring nodes are acquired during the first message propagation at the time step t=1 by the first graph structure:

$$a_n{}^{(t)}=\Sigma_{m=1,m \neq n}^{N}\Sigma_{j=1}^{C}\varepsilon_{ij}h_m{}^{(t-1)} \oplus \Sigma_{m=1,m \neq n}^{N}\Sigma_{j=1}^{C}\varepsilon_{ji}h_m{}^{(t-1)} \qquad (2)$$

Where N denotes the number of entity objects detected in the image, $\oplus$ denotes the connection in the dimension of feature, and $h_m{}^{(t)}$ denotes the representation of the $m^{th}$ neighboring node of the current node at the time step t.

Then, by using the aggregated features $a_n{}^{(t)}$ and the features $h_n{}^{(t-1)}$ of the node at this moment as the input to the gated recurrent unit (GRU), the node representation is enhanced by the following equations:

$$z_n{}^{(t)}=\sigma(W_z a_n{}^{(t)}+U_z h_n{}^{(t-1)}) \qquad (3)$$

$$r_n{}^{(t)}=\sigma(W_r a_n{}^{(t)}+U_r h_n{}^{(t-1)}) \qquad (4)$$

$$\widetilde{h_n{}^{(t)}}=\tanh(W_h a_n{}^{(t)}+U_h(r_n{}^{(t)} \odot h_n{}^{(t-1)})) \qquad (5)$$

$$c_n{}^{(t)}=(1-z_n{}^{(t)}) \odot h_n{}^{(t-1)}+z_n{}^{(t)} \odot \widetilde{h_n{}^{(t)}} \qquad (6)$$

where, $z_n{}^{(t)}$ and $r_n{}^{(t)}$ denote the reset gate and the update gate of the gated recurrent unit; $\widetilde{h_n{}^{(t)}}$ denotes the current candidate set; $c_n{}^{(t)}$ denotes the enhanced node representation output; $W_z$, $U_z$, $W_r$, $U_r$, $W_h$, $U_h$ are all the learned parameter matrices; and $\odot$ denotes the product of elements corresponding to the features.

104: After each message propagation, the output node features are used as the visual attention mechanism to merge internal region visual features extracted by entity objects, and the merged internal region visual features are used as visual features to be used in the next message propagation by corresponding nodes in the first graph structure.

Firstly, the enhanced node representation $c_n^{(t)}$ output in the step 103 is combined with each region visual feature $f_m^{(n)}$ output in the step 102 to compute an unnormalized relevance score $e_{m,n}^{(t)}$:

$$e_{m,n}^{(t)} = w^T \tanh(W_a c_n^{(t)} + U_a f_m^{(n)} + b_n) \quad (7)$$

where $w$, $W_a$, $U_a$, $b_n$ are all the learned parameters.

Secondly, the unnormalized relevance score is normalized to acquire a weight distribution value $a_{m,n}^{(t)}$ of the visual attention mechanism:

$$a_{m,n}^{(t)} = \exp\{e_{m,n}^{(t)}\} / \Sigma_{m=1}^M \exp\{e_{m,n}^{(t)}\} \quad (8)$$

Then, the weighted sum of M region features $f^{(n)} = \{f_m^{(n)}\}$ of each entity object is obtained by the acquired weight distribution value of the visual attention mechanism, to obtain the merged visual representation $\widehat{f}_n$:

$$\widehat{f}_n^{(n)} = \Sigma_{m=1}^M a_{m,n}^{(t)} f_m^{(n)} \quad (9)$$

Finally, the merged visual representation $\widehat{f}_n^{(n)}$ is acquired, and message propagation is performed by Eq. (2) to Eq. (6) by using the merged visual representation as the visual features to be used in the next message propagation by corresponding nodes in the first graph structure. In this case, the Eq. (1) may be integrated as:

$$h_n^{(t)} = \begin{cases} \varphi_n(v_n), & t = 0 \\ \varphi_n(\widehat{f}_n^{(n)}), & t \neq 0 \end{cases} \quad (10)$$

105: After a certain number of times of message propagations, the output node features are combined with the visual features of the entity objects to infer the category of the objects.

The output $\{h_1^{(T_0)}, h_2^{(T_0)}, \ldots, h_N^{(T_0)}\}$ of each node in the first graph structure after $T_0$ message propagations is combined with the initialized node features (i.e., the visual features of the entity objects) in the dimension of feature, and then input to the softmax function for calculation. The output maximum probability distribution value is the inferred category of the corresponding objects:

$$o_n = \mathrm{argmax}(\mathrm{softmax}(W_0(h_n^{(0)} \oplus h_n^{(T_0)}))) \quad (11)$$

where, $W_0$ denotes the learned parameter matrix, and $o_n$ denotes the predicted category of the $n^{th}$ entity object.

106: The features of each object set extracted in the step 102 and the region visual features of the corresponding two entity objects are used as a set of nodes, and connected in accordance with the statistical probabilities of visual relationships to form a triplet graph structure. Similarly, the visual representation of the current node is enhanced by the message propagation mechanism.

Firstly, the visual relationship distribution $\{\varepsilon'^{(k)}_{ij}\}$, which is output in the step 101, is used as the edge of the triplet graph structure.

$$E_{triplet} = \{\varepsilon'^{(k)}_{ij} | k = 1, 2, \ldots, |K|\}$$

where $E_{triplet}$ denotes a set of edges of the triplet graph structure.

The features $F_u = \{f_{ij} | i,j = 1, 2, \ldots, |N|\}$ of each object set, which is output in the step 102, and the region visual features $f^{(n)} = \{f_m^{(n)}\}$ of the corresponding two entity objects are used as vertices of the triplet graph structure:

$$V_{triplet} = \{f_m^{(i)}, f_m^{(j)}, f_{ij} | m = 1, 2, \ldots, |M|\}$$

where $V_{triplet}$ denotes a set of vertices of the triplet graph structure.

In this way, K triplet graph structures $G_{triplet}^{(k)} = \{(V_{triplet}, \varepsilon'^{(k)}_{ij})\}_{k=1}^K$ are constructed. Each of the triplet graph structures executes the same operation. The message propagation process will be described by taking one triplet graph structure as an example.

Firstly, before message propagation, in order to learn the initial visual attention weight to merge the region visual features at the vertices of the triplet entity objects, the set of entity object features $V = \{v_n\}_{n=1}^N$ output in the step 102 is used to replace, at the time step t=0, the region visual features at the vertices of the triplet entity objects to initialize the representations $h_{o_i,k}^{(t)}$, $h_{o_j,k}^{(t)}$ and $h_k^{(t)}$, which respectively denote the initialized representations of two entity objects $o_i$ and $o_j$ belonging to the category i and the category j, and the initialized representation of the object set, k indicates that the two entity objects have the $k^{th}$ visual relationship:

$$h_{o_i,k}^{(t)} = \varphi_{o_i}(v_{o_i}), t = 0 \quad (12)$$

$$h_{o_j,k}^{(t)} = \varphi_{o_j}(v_{o_j}), t = 0 \quad (13)$$

$$h_k^{(t)} = \varphi_k(f_{ij}), t = 0 \quad (13)$$

where, $\varphi_{o_i}$, $\varphi_{o_j}$, $\varphi_k$ are learned transformation matrices, and $v_{o_i}$, $v_{o_j}$, $f_{ij}$ are features of the fully-connected layer in the entity objects and object sets output in the step 102.

Secondly, the features $a_{o_i,k}^{(t)}$, $a_{o_j,k}^{(t)}$ and $a_k^{(t)}$ of each node after its aggregation with neighboring nodes are acquired during the first message propagation at t=1 by the triplet graph structure:

$$a_{o_i,k}^{(t)} = \varepsilon'^{(k)}_{ij} h_{o_i,k}^{(t-1)} \quad (14)$$

$$a_{o_j,k}^{(t)} = \varepsilon'^{(k)}_{ij} h_{o_j,k}^{(t-1)} \quad (15)$$

$$a_k^{(t)} = \varepsilon'^{(k)}_{ij} (h_{o_i,k}^{(t-1)} + h_{o_j,k}^{(t-1)}) \quad (16)$$

Then, by using the aggregated features $a_{o_i,k}^{(t)}$, $a_{o_j,k}^{(t)}$ and $a_k^{(t)}$ and the features $h_{o_i,k}^{(t)}$, $h_{o_j,k}^{(t)}$ and $h_k^{(t)}$ of the respective node at this moment as the input to the GRU, message propagations are performed by Eq. (3) to Eq. (6) to enhance the respective node representations $c_{o_i,k}^{(t)}$, $c_{o_j,k}^{(t)}$ and

107: The features of the triplet graph structures, which are obtained in the step 106, after their aggregation with neighboring nodes are combined, the combined features are used as nodes in a second graph structure and connected in accordance with equiprobable edges to form the second graph structure. Then, the message propagation in the second graph structure is performed.

Firstly, nodes and edges of the second graph structure $G_{rel} = \{V_{rel}, E_{rel}\}$ are defined.

The features $a_{o_i,k}^{(t)}$, $a_{o_j,k}^{(t)}$ and $a_k^{(t)}$ of the triplet graph structures, which are output in the step 106, after their aggregation with neighboring nodes are acquired, mapped to a feature space in a same dimension, and then connected in the dimension of feature as nodes in the second graph structure. Meanwhile, at time step t=0, the nodes in the second graph structure are initialized with zero vector:

$$g_k^{(t)} = \begin{cases} 0, t = 0 \\ W_g(W_i * a_{o_i,k}^{(t)} \oplus W_k * a_k^{(t)} * \bigoplus W_j * a_{o_j,k}^{(t)}), t \neq 0 \end{cases} \quad (17)$$

where, $W_g$, $W_i$, $W_j$, $W_k$ are all the learned parameter matrices, and $g_k^{(t)}$ denotes the node features of the second graph structure at the time step t.

Since there are total K triplet graph structures, there are K nodes in the second graph structure. The set of nodes is denoted by:

$$V_{rel} = \{g_k^{(t)} | k=1,2,\ldots,|K|\}$$

The nodes in the second graph structure are fully connected, and edges connecting each node and its neighboring nodes are equiprobable edges:

$$E_{rel} = \left\{\varepsilon''_{uk} = \frac{1}{K-1} | u = 1, 2, \ldots, |K|; u \neq k\right\}$$

where, $\varepsilon'_{uk}$ denotes the edge connecting the $u^{th}$ node and the $k^{th}$ node, and the subscript $u_k$ of $\varepsilon'_{uk}$ denotes the $u^{th}$ neighboring node of the $k^{th}$ node, represented by $\{g, |u \in N(k)\}$, where $N(k)$ is a set of neighboring nodes of the $k^{th}$ node.

Then, the computation method for the message propagation in the second graph structure is defined:

$$g_k^{(t)} = ReLu\left(g_k^{(t-1)} + \sum_{u \in N(k)} \varepsilon''_{uk} W_e g_u^{(t-1)}\right) \quad (18)$$

where, ReLu denotes the activation function and $W_e$ denotes the learned parameter matrix.

108: After each message propagation, the node features of the second graph structure, which are output in the step 107, are combined with the features of corresponding entity object nodes in the triplet, the combined features are used as a visual attention mechanism and the internal region visual features extracted by two entity objects are merged, and the merged region visual features are used as visual features to be used in the next message propagation by corresponding entity object nodes in the triplet; and The node features $g_k^{(t)}$ of the second graph structure, which are output in the step 107, are connected in the dimension of feature with the corresponding entity object features $c_{o_i,k}^{(t)}$ and $c_{o_j,k}^{(t)}$ in the triplet, which are output after the message propagation in the step 106. Then, by combining with each region visual feature $f_m^{(n)}$ output in the step 102, unnormalized relevance scores $\tilde{e}_{m,n,o_i}^{(t)}$ and $\tilde{e}_{m,n,o_j}^{(t)}$ are computed:

$$\tilde{e}_{m,n,o_i}^{(t)} = \tilde{w}^T \tanh(\widetilde{W_a}[c_{o_i,k}^{(t)} \oplus g_k^{(t)}] + \widetilde{U_a} f_m^{(n)} + \widetilde{b_a}) \quad (19)$$

$$\tilde{e}_{m,n,o_j}^{(t)} = \tilde{w}^T \tanh(\widetilde{W_a}[c_{o_j,k}^{(t)} \oplus g_k^{(t)}] + \widetilde{U_a} f_m^{(n)} + \widetilde{b_a}) \quad (20)$$

Where, $\tilde{w}$, $\widetilde{W_a}$, $\widetilde{U_a}$, $\widetilde{b_a}$ are all the learned parameters.

Then, the unnormalized relevance scores $\tilde{e}_{m,n,o_i}^{(t)}$ and $\tilde{e}_{m,n,o_j}^{(t)}$ are normalized by Eq. (8) to obtain the weight distribution values $\tilde{a}_{m,n o_i}^{(t)}$ and $\tilde{a}_{m,n,o_j}^{(t)}$ of the visual attention mechanism, respectively. Then, the weighted sum of region features $f^{(n)} = \{f_m^{(n)}\}$ of the corresponding entity objects is obtained to obtain the merged visual representations $\tilde{f}_{o_i,k}^{(t)}$ and $\tilde{f}_{o_j,k}^{(t)}$.

Finally, the obtained merged visual representations $\tilde{f}_{o_i,k}^{(t)}$ and $\tilde{f}_{o_j,k}^{(t)}$ are used as visual features to be used in the next message propagation by corresponding entity objects in the triplet graph structure. Message propagations are performed in the triplet graph structure and the second graph structure calculated by Eq. (3) to Eq. (6) and Eq. (18). In this case, Eq. (12) and Eq. (13) may be integrated as:

$$h_{o_i,k}^{(t)} = \begin{cases} \varphi_{o_i}(v_{o_i}), t = 0 \\ \varphi_{o_i}(\tilde{f}_{o_i,k}^{(t)}), t \neq 0 \end{cases} \quad (21)$$

$$h_{o_j,k}^{(t)} = \begin{cases} \varphi_{o_j}(v_{o_j}), t = 0 \\ \varphi_{o_j}(\tilde{f}_{o_j,k}^{(t)}), t \neq 0 \end{cases} \quad (22)$$

109: After a certain number of times of message propagations, the output triplet node features and the node features of the second graph structure are combined to infer predicates between object sets.

The nodes of each entity object in the triplet graph structure after $T_k$ message propagations are output, $\hat{h}_{o_i}^{(T_k)} = \{h_{o_i,1}^{(T_k)}, h_{o_i,2}^{(T_k)}, \ldots, h_{o_i,K}^{(T_k)}\}$, which is processed with the average pooling strategy and then combined with the initialized node features, i.e., the visual features of the entity object itself in the dimension of feature:

$$H_{o_i} = W_{hs}([\Sigma_{k=1}^K h_{o_i,k}^{(T_k)}/K, h_{o_i,k}^{(0)}]) \quad (23)$$

$$H_{o_j} = W_{ho}([\Sigma_{k=1}^K h_{o_j,k}^{(T_k)}/K, h_{o_j,k}^{(0)}]) \quad (24)$$

where, $W_{hs}$, $W_{ho}$ denotes the learned parameter matrices, $H_{o_i}$ denotes the combination of representations of the entity object $o_i$ after $T_k$ message propagations, and $H_{o_j}$ denotes the combination of representations of the entity object $o_j$ after $T_k$ message propagations.

The nodes of the object sets in the triplet graph structure after $T_k$ message propagations are output, $\hat{h}_k^{(T_k)} = \{h_1^{(T_k)}, h_2^{(T_k)}, \ldots, h_K^{(T_k)}\}$, which are connected with the object set features $f_{ij}$ of the initialized node and the output $\hat{g}_k^{(T_k)} = \{g_1^{(T_k)}, g_2^{(T_k)}, \ldots, g_K^{(T_k)}\}$ of each node in the second graph structure in the dimension of feature:

$$H_{i,j,k} = W_p([h_k^{(T_k)}, f_{ij}, g_k^{(T_k)}]) \quad (25)$$

where, $W_p$ denotes the learned parameter matrix, and $H_{i,j,k}$ denotes the combination of representations of the entity object set after $T_k$ message propagations in the statistical probabilities of the $k^{th}$ visual relationship.

Then, the outputs from Eq. (23) to Eq. (26) are combined in the dimension of feature:

$$r_{i \to j} = W_r([H_{o_i}, H_{o_j}, H_{i,j,1}, H_{i,j,2}, \ldots, H_{i,j,K}]) \quad (26)$$

Where, $W_r$ denotes the learned parameter matrix.

Finally, the output from Eq. (28) is input to the softmax function for calculation. The output maximum probability distribution value is the inferred corresponding relationship predicate between object sets belonging to the category i and the category j.

In conclusion, the embodiments of the present invention avoid the ignoring of the interaction of fine-grained information about the regions inside the entity objects during the detection of visual relationships. The accuracy of visual relationship detection, i.e., the recall rate is improved. Meanwhile, the method is applicable to any visual relationship detection databases.

In the embodiments of the present invention, except for the special description of the models of the devices, the models of other devices are not limited, as long as the devices can complete the functions described above.

Figure 3:
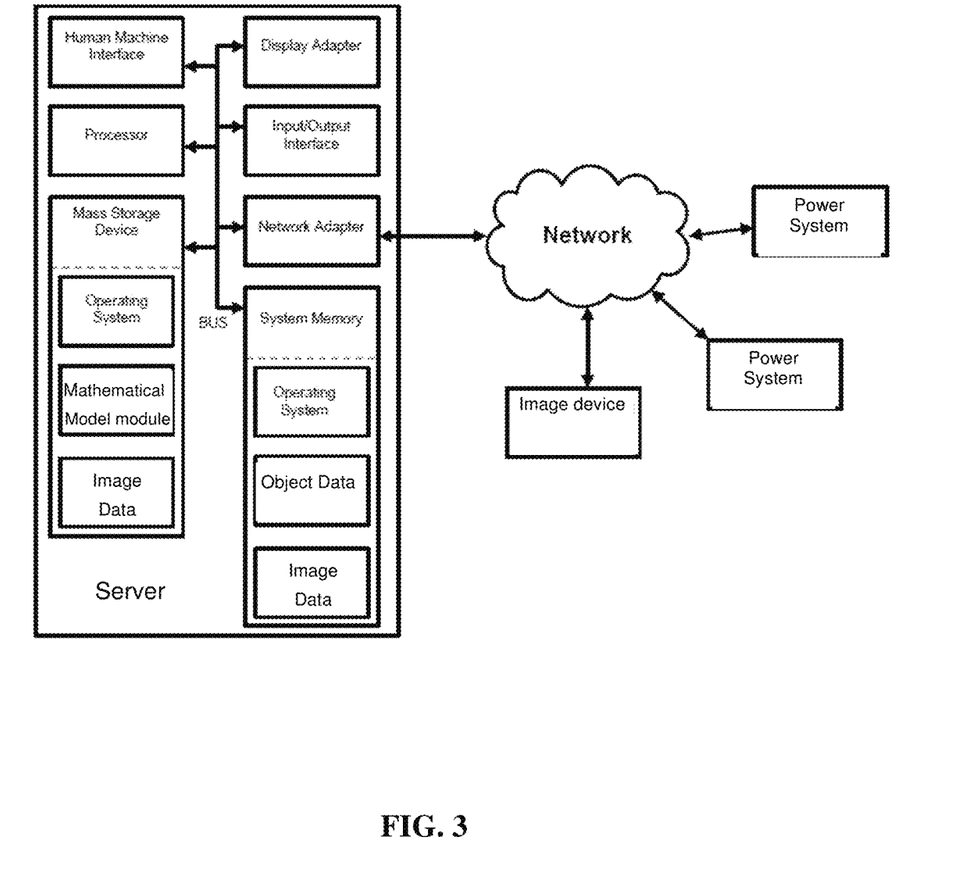
FIG. 3 is a block diagram illustrating a computing system in which the present system and method can operate.

Referring to FIG. 3, the methods and systems of the present disclosure can be implemented on one or more computers or processors. The methods and systems disclosed can utilize one or more computers or processors to perform one or more functions in one or more locations. The processing of the disclosed methods and systems can also be performed by software components. The disclosed systems and methods can be described in the general context of computer-executable instructions such as program modules, being executed by one or more computers or devices. For example, each server or computer processor can include the program modules such as mathematical construction module, simplifying module, and maximum delay calculation module, and other related modules described in the above specification. These program modules or module related data can be stored on the mass storage device of the server and one or more client devices. Each of the operating modules can comprise elements of the programming and the data management software.

The components of the server can comprise, but are not limited to, one or more processors or processing units, a system memory, a mass storage device, an operating system, a system memory, an Input/Output Interface, a display device, a display interface, a network adaptor, and a system bus that couples various system components. The server and one or more power systems can be implemented over a wired or wireless network connection at physically separate locations, implementing a fully distributed system. By way of example, a server can be a personal computer, portable computer, smartphone, a network computer, a peer device, or other common network node, and so on. Logical connections between the server and one or more power systems can be made via a network, such as a local area network (LAN) and/or a general wide area network (WAN).

It may be understood by those skilled in the art that the accompanying drawings are only schematic views of a preferred embodiment, and the serial numbers of the foregoing embodiments of the present invention are only for description and do not represent the priority of the embodiments.

What described above is merely a preferred embodiment of the present invention and not intended to limit the present invention. Any modifications, equivalent replacements and improvements made within the spirit and principle of the present invention should fall into the protection scope of the present invention.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

CITED REFERENCES

[1] C. Lu, R. Krishna, M. S. Bernstein, and F. Li. Visual relationship detection with language priors. In ECCV, pages 852-869, 2016.
[2] A. Karpathy and L. Fei-Fei. Deep visual-semantic alignments for generating image descriptions. In Proceedings of the IEEE conference on computer vision and pattern recognition, pages 3128-3137, 2015.
[3] S. J. Rennie, E. Marcheret, Y. Mroueh, J. Ross, and V. Goel. Self-critical sequence training for image captioning. In CVPR, volume 1, page 3, 2017.
[4] W. Norcliffe-Brown, S. Vafeias, and S. Parisot. Learning conditioned graph structures for interpretable visual question answering. In NIPS, pages 8344-8353, 2018.
[5] Peter Anderson, Xiaodong He, Chris Buehler, Damien Teney, Mark Johnson, Stephen Gould, and Lei Zhang. Bottom-up and top-down attention for image captioning and visual question answering. Proc. CVPR, 2017
[6] Kuang-Huei Lee, Xi Chen, Gang, Hua, Houdong Hu, and Xiaodong He. Stacked Cross Attention for Image-Text Matching. In ECCV, pages 212-218, 2018.
[7] Ying Zhang, and Huchuan Lu. Deep Cross-Modal Projection Learning for Image-Text Matching. In ECCV, pages 707-723, 2018.
[8] A. Das, S. Kottur, K. Gupta, A. Singh, D. Yadav, S. Lee, J. M. F. Moura, D. Parikh, and D. Batra. Visual dialog. IEEE Trans. Pattern Anal. Mach. Intell., 41(5):1242-1256, 2019
[9] Z. Gan, Y. Cheng, A. E. Kholy, L. Li, J. Liu, and J. Gao. Multi-step reasoning via recurrent dual attention for visual dialog. In ACL 2019, pages6463-6474, 2019.
[10] M. Haurilet, A. Roitberg, and R. Stiefelhagen. It's not about the journey; it's about the destination: Following soft paths under question-guidance for visual reasoning. In CVPR 2019, pages 1930-1939, 2019.
[11] T. Gokhale, S. Sampat, Z. Fang, Y. Yang, and C. Baral. Cooking with blocks: A recipe for visual reasoning on image-pairs. In CVPR Workshops 2019, pages 5-8, 2019.
[12] Mohammad Amin Sadeghi and Ali Farhadi. Recognition using visual phrases. In CVPR, 2011
[13] Chen Gao, Yuliang Zou, and Jia-Bin Huang. Ican: Instance centric attention network for human-object interaction detection. In BMVC, 2018
[14] Yikang Li, Wanli Ouyang, and Xiaogang Wang. Vip-cnn: A visual phrase reasoning convolutional neural network for visual relationship detection. In CVPR, 2017. 1, 2
[15] Ruichi Yu, Ang Li, Vlad I. Morariu, and Larry S. Davis. Visual relationship detection with internal and external linguistic knowledge distillation. In ICCV, 2017. 2
[16] Bohan Zhuang, Lingqiao Liu, Chunhua Shen, and Ian Reid. Towards context-aware interaction recognition for visual relationship detection. In ICCV, 2017.

What is claimed is:

1. A visual relationship detection method based on a region-aware learning mechanism, executed by a processor, comprising:
  acquiring a triplet graph structure and combining features after its aggregation with neighboring nodes, using the features as nodes in a second graph structure, and connecting in accordance with equiprobable edges to form the second graph structure;
  combining node features of the second graph structure with features of corresponding entity object nodes in the triplet, using the combined features as a visual attention mechanism and merging internal region visual features extracted by two entity objects, and using the merged region visual features as visual features to be used in the next message propagation by corresponding entity object nodes in the triplet; and after a certain number of times of message propagations, combining the output triplet node features and the node features of the second graph structure to infer predicates between object sets.

2. The visual relationship detection method based on a region-aware learning mechanism according to claim 1, wherein the step of "acquiring a triplet graph structure" specifically, executed by the processor, comprises:

using region visual features of the entity objects as features of a set of nodes in the first graph structure, connecting the entity objects in accordance with probabilities of co-occurrence, and gathering feature information of neighboring nodes by a message propagation mechanism to enhance the visual representation of the current node;

using, after each message propagation, the output node features as the visual attention mechanism and also as the visual features to be used in the next message propagation by the nodes in the first graph structure; and using the extracted features of each object set and region visual features of the corresponding two entity objects as a set of nodes, and connecting in accordance with the statistical probabilities of visual relationships to form a triplet graph structure.

3. The visual relationship detection method based on a region-aware learning mechanism according to claim 2, wherein the first graph structure is specifically as follows: co-occurrence matrixes are used as edges of the first graph structure and region visual features are used as vertices of the first graph structure.

4. The visual relationship detection method based on a region-aware learning mechanism according to claim 2, wherein the step of "using, after each message propagation, the output node features as the visual attention mechanism and also as the visual features to be used in the next message propagation by the nodes in the first graph structure" executed by the processor, specifically comprises:

combining the enhanced node representation with each region visual feature, to compute an unnormalized relevance score;

normalizing the unnormalized relevance score to acquire a weight distribution value of the visual attention mechanism;

obtaining the weighted sum of M region features of each entity object by the acquired weight distribution value of the visual attention mechanism, to obtain the merged visual representation; and acquiring the merged visual representation, and performing message propagation by using the merged visual representation as the visual features to be used in the next message propagation by corresponding nodes in the first graph structure.

5. The visual relationship detection method based on a region-aware learning mechanism according to claim 2, wherein the triplet graph structure is specifically as follows:

the statistical probabilities of visual relationships are used as edges of the triplet graph structure; and features of each object set and the region visual features of the corresponding two entity objects are used as vertices of the triplet graph structure.

6. The visual relationship detection method based on a region-aware learning mechanism according to claim 1, wherein the second graph structure is specifically executed by the processor, as follows:

Acquiring the output features of each triplet graph structure after its aggregation with neighboring nodes, mapping the acquired features to a feature space in a same dimension, and then connected them in the dimension of feature as the nodes in the second graph structure; and fully connecting the nodes in the second graph structure, and edges connecting each node and its neighboring nodes are equiprobable edges.

7. The visual relationship detection method based on a region-aware learning mechanism according to claim 1, wherein the step of "using the combined features as a visual attention mechanism and merging internal region visual features extracted by two entity objects", executed by the processor, specifically comprises:

computing an unnormalized relevance score by the combined features and the output each region visual feature; and normalizing the unnormalized relevance score to acquire a weight distribution value of the visual attention mechanism, and obtaining the weighted sum of region features of the corresponding entity object to obtain the merged visual representation.

8. The visual relationship detection method based on a region-aware learning mechanism according to claim 1, wherein the step of "combining the output triplet node features and the node features of the second graph structure", executed by the processor, specifically comprises:

outputting the nodes of each entity object in the triplet graph structure after $T_k$ message propagations, processing with the average pooling strategy and then combining with the visual features of the entity object in the dimension of feature; and outputting the nodes of the object sets in the triplet graph structure after $T_k$ message propagations, and connecting with the object set features of an initialized node and the output of each node in the second graph structure in the dimension of feature.

* * * * *